United States Patent
Sato et al.

[15] 3,637,058
[45] Jan. 25, 1972

[54] SPINDLE-ORIENTED STOP MECHANISM FOR MACHINE TOOL

[72] Inventors: Yoshikazu Sato, No. 1026, Shimotakaido, 4-chome, Suginami-ku, Tokyo; Masaru Tanaka, No. 2211, Okura, Machida-shi, Tokyo, both of Japan

[22] Filed: Sept. 24, 1969

[21] Appl. No.: 860,716

[52] U.S. Cl............................................192/146, 192/148
[51] Int. Cl...........................................................F16d 71/00
[58] Field of Search...............192/146, 147, 148; 318/20.102

[56] References Cited

UNITED STATES PATENTS

| | | | |
|---|---|---|---|
| 1,265,529 | 5/1918 | Schoenky | 192/146 |
| 2,907,434 | 10/1959 | Wenzel | 192/146 |
| 3,265,946 | 8/1966 | Johnson et al. | 318/20.102 X |

*Primary Examiner*—Allan D. Herrmann
*Attorney*—Harold L. Halpert

[57] ABSTRACT

A stop mechanism for stopping the spindle of a machine tool in a preselected position. The drive mechanism for the spindle is deenergized by a signal from a tape-operated controller and the inertia of the drive system is permitted to drive the spindle till the energy of the system is dissipated. A second signal from the controller operates a system of electromagnetic clutches and gear trains to slowly drive the spindle till a sensing device feels a selected position of the spindle. The device then deenergizes the slow drive and the inertia of the system moves the spindle toward the selected position. A stop mechanism is operated to stop the slowly coasting mechanism and to lock the spindle in the selected position. In the event the spindle does not reach the selected position, the slow drive is again energized and the process of driving and coasting repeated till the position is secured.

6 Claims, 9 Drawing Figures

PATENTED JAN25 1972

INVENTOR.
Yoshikazu Sato
BY Masaru Tanaka
Harold L. Halpert
Agent

SPINDLE-ORIENTED STOP MECHANISM FOR MACHINE TOOL

This invention pertains to a spindle-oriented stop mechanism for machine tools.

Heretofore, a strong brake was applied to the main spindle or to other rotating shafts in the transmission system to stop the main spindle in a preselected position. The drawback of this system lies in the enormous shock produced at the gears and the motor for instantaneous braking. This shock produces wear and consequently results in deterioration of accuracy and diminished life of the machine tool.

The object of this invention is to provide a machine tool with means for stopping the main spindle in preselected position so that a key mounted on the spindle always engages a key-way formed in the flange of the tool.

Another object of this invention is to provide a machine tool for stopping a spindle in a preselected stop position by means of disconnecting the drive system, driving the main spindle at a slow speed then, when rotation by the inertia of the system is about to terminate, the main spindle is forced to stop in a predetermined position.

Still another object of this invention is to provide a spindle-orienting system which barely shocks the gears and the motor when stopping the main spindle and thereby prevents, wear in the rotating parts and deterioration in the accuracy of the machine tool.

These and other objects of the invention will become manifest upon reading the following description in conjunction with the accompanying drawings wherein.

Figures 1, 2, 3:
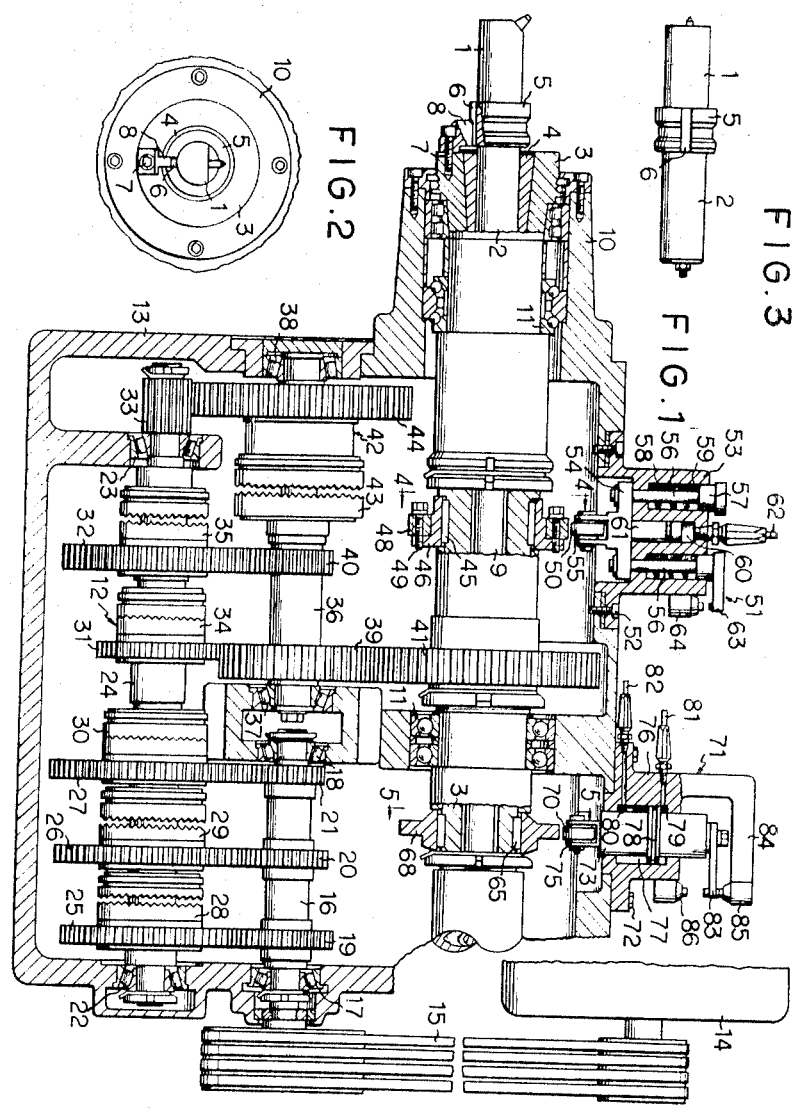
FIG. 1 is a sectional side view of the speed-reducing transmission system with some of the parts in section.
FIG. 2 is a front view of the main spindle and a part of the spindle head.
FIG. 3 is a side view of a tool.
Figure 4:
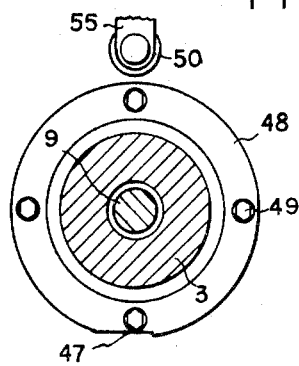
FIG. 4 is a section along 4—4 of FIG. 1.
Figure 5:
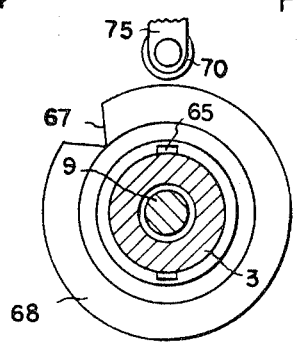
FIG. 5 is a section along 5—5 of FIG. 1.
Figure 6:
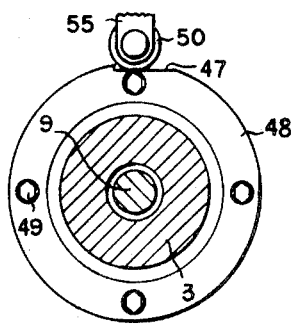
FIG. 6 is a front view showing a first positioning device engaging the disc of FIG. 4.
Figure 7:
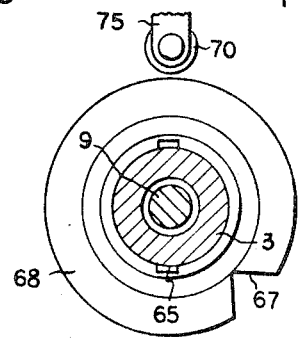
FIG. 7 shows a second positioning device engaging a second disc when the first positioning device engages a notch in the first disc.
Figure 9:
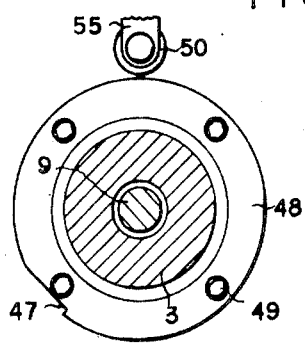
FIG. 9 is a front view showing the first positioning device engaging the first disc when the second positioning device and second disc are in stop position.
Figure 8:
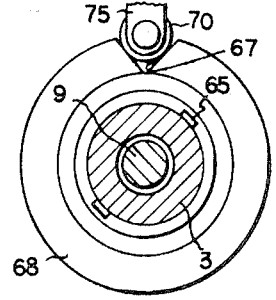
FIG. 8 is a front view showing the second positioning device engaging the second disc in the stop position.

FIG. 1 shows main spindle 3 with tool 1 rotating at normal cutting speed. The slow speed-reducing gear train 42 is disengaged by the opened electromagnetic clutch 43. Transmission gear train 12 rotates the main spindle at normal cutting speed.

Shaft 2 of tool 1 is held in collet 4 of main spindle 3. Shaft 2 of tool 1 has flange 5 formed with a key-way 6 which is engaged by a key 8 fixedly mounted on spindle 3 by screw 7. Since key 8 engages key-way 6 the tool cannot slip in collet 4 during the cutting operation due to the frictional force of cutting. Collet 4 securely grasps tool shaft 2 by draw bar 9. Main spindle 3 is rotatably mounted on the spindle head 10 by bearing 11.

Main spindle head 10 contains speed reduction transmission system 12 in change gear casing 13. Drive shaft 16 is belt driven by motor 14 and belts 15 and is supported by bearings 17, 18 in casing 13. Drive shaft 16, has gears 19, 20, 21, all of different sizes, fixedly mounted thereon to engage gears 25, 26, 27, rotatably mounted on shaft 24 which in turn is mounted on bearings 22, 23 in casing 13.

Each of the aforedescribed free-turning gears 25, 26, 27 are connected by electromagnetic clutches. When the clutches are disengaged the gears freely rotate on shaft 24. When one of the electromagnetic clutches is energized, shaft 24 is driven by the gear so engaged.

Variable speed shaft 24 has gears 31, 32 of different diameters rotatable mounted, and small gear 33 fixedly mounted thereon. Gears 31, 32 have electromagnetic clutches 34, 35, which, when unenergized, leaves gears 31, 32 free to rotate on shaft 24, and when energized, rotation of shaft 24 is engaged to either gear 31 or 32.

Change gear casing 12 has another speed change shaft 36 rotatably mounted on bearings 37, 38. This shaft 36 has gears 39, 40 fixedly mounted thereon which engage gears 31, 32. Gear 39 engages gear 41 which is fixedly mounted on main spindle 3.

By energizing and deenergizing the various electromagnetic clutches, it is possible to change the combination of gears, and by controlling the speed of the motor, it is possible to obtain at least 18 different speeds of rotation of the main spindle 3. The engaging and disengaging of the various electromagnetic clutches is controlled by programmed signals recorded on tape.

Variable speed shaft 36 has slow speed transmission system 42, consisting of electromagnetic clutch 43 and gear 44 rotatably mounted thereon and engaged to gear 33 on shaft 24. When clutch 43 is energized and aforedescribed clutches 34, 35 are disengaged, electromagnetic clutch 30 is engaged and rotation of gear 44 is transmitted to shaft 36, which rotates gear 39 which in turn rotates main spindle 3 through gear 41 at a slow speed such as 40 r.p.m.

The signals controlling clutch 43 and other clutches to operate slow speed transmission system 42 is controlled by signals programmed and recorded on tape. Disengagement of clutch 43 which disconnects slow speed drive system 43 is initiated by a signal from the first positioning device which will be described in detail later.

Main drive spindle 3 has fixedly mounted thereto by keys 45 a disc which comprises a collar 46 with ring 48 having a notch 47 on its periphery mounted thereon by screws.

The disc is engaged by roller 50 of the first positioning or sensing device 51 which is vertically slidably mounted on the top surface of main spindle housing in body 53 by bolts 52. Roller 50 is rotatably mounted on holder 55 which is mounted on base 54. Roller 50 is positioned to have a slight gap between disc 48. Two rods 56 are spring loaded by springs 59 acting between rod heads 57 and bottom of spring cavity 58, to always hold rods 56 upwards thus holding baseplate 54 with roller 50 so that it will not touch disc 48. Positioner body 53 has a cylinder 60 and a piston 61 reciprocable therein and which is attached to positioner base 54. Cylinder 60 has pipe 62 which permits entry or exhaust of pressurized fluid therefrom. When pressurized fluid enters cylinder 60, piston 61 is moved downwards so that roller 50 is pushed against disc 48 and engages notch 47. Entry of the pressurized fluid into cylinder 60 is controlled by a signal from the tape control center with recorded tape.

One of the rods 56 has a contacting button 63 mounted thereon. Contact 63 is held at a predetermined distance from switch 64 which is fixedly mounted on the side of positioner body 53. When roller 50 engages the notch 47 in disc 48, contacting button 63 contacts switch 64 and activates it to produce a signal which disengages clutch 43 in slow speed transmission system 42. Simultaneously this signal also opens a valve to exhaust cylinder 60 of the pressurized fluid and activates the second positioning device, which will be described later.

Spindle shaft 3 has disc 68 fixedly mounted thereon by key 65 and has a V-shaped notch 67 formed on its periphery. Positioner device 71 has roller 70 which engages disc 68, said device is slidably mounted in body 76 which is bolted by bolts 72 to the top surface of spindle head 10. Roller 70 is rotatably mounted on roller holder 75 which is mounted on piston rod 73. A small gap is formed between roller 70 and the periphery of disc 68. Cylinder cavity 77 is divided into an upper chamber 79 and a lower chamber 80 by piston 78. Pipes 81, 82 are connected to each chamber to fill or exhaust the chambers with pressurized fluid. Pressurized fluid is allowed to enter chamber 79 through pipe 81. A signal from switch 64 of positioner device 51, activates a timer device (not shown) which in turn sends a signal, delayed by certain fixed amount, to the electromagnetic valve connected to pipe 81.

Contactor arm 83 is always held in the uppermost position where it contacts switch 85 held by bracket 84 attached to cylinder body 76. In this position, switch 85 sends a signal indicating that roller 70 is not contacting disc 68. Another contact switch 86 fixedly mounted on the side of cylinder body 76 is mounted at a distance such that when roller 70 engages the V-shaped notch 67 in disc 68, contactor button 83 engages lower switch 86 to make contact, the signal therefrom initiates motion of piston rod 73 to return to the upper position.

The following is an explanation of the operation of the example illustrated in the drawings. The following operation is initiated by electrical signals from a tape-controlled control device. Electromagnetic clutches 30, 34 are engaged while all other clutches are disengaged (FIG. 1). Rotation of drive shaft 16 is transmitted to the main spindle through gears 21, 27, variable speed shaft 24 and gears 31, 39, 41. The main spindle 3 is rotated at the proper speed for cutting operation with tool 1. When the cutting operation is completed, a signal from the tape-controlled control device cuts off the electric power supply to drive motor 14. The motor 14, speed change transmission system 12, and main spindle 3 will coast to a stop. In this case the position or orientation of the main spindle in stop position is indefinite.

The next signal issued from the tape-controlled device disengages electromagnetic clutch 34, and engages electromagnetic clutch 43 of the slow speed transmission system 42. Simultaneously electric current is applied to the motor 14. Motor 14 rotates to drive shaft 16. Rotation of shaft 16 is transmitted to variable speed shaft 24 through gears 21, 27; variable speed shaft 36 is driven by gears 33, 44 and drives main spindle 3 through gears 39 and 41. In this case the rotation of the main spindle is a slow speed of, for instance, 40 r.p.m.

Still another signal from the tape-controlled control device allows pressurized fluid to enter cylinder 60 through pipe 62, of the first positioning device. Pressurized fluid moves piston 61, base 54 and roller 50 downwards to engage the periphery of disc 48 mounted on the spindle. When roller 50 engages notch 47, positioning device 51 is lowered causing contact button 63 to contact switch 64 which in turn makes contact to send a signal for disengaging electromagnetic clutch 43 of the slow speed gear system 42. Simultaneously the supply of pressurized fluid to cylinder 60 is cutoff and pipe 62 is opened to allow the escape of fluid from the cylinder and the power supply to drive motor 14 is cutoff. Piston 61 with rods 56 and base 54 is returned to the lifted position by springs 59 and the first positioning device 51 returns to its rest position. Disengagement of electromagnetic clutch 43 of the slow speed transmission system 42 and opening of power supply circuit to the main drive motor 14 causes main spindle 3 gears 31, 32, 39, 41 and variable speed shaft 36 to coast to a halt by their inertia.

A signal from switch 64 of the first positioning device 51 is delayed by a timer switch. Approximately 1.5 revolutions before main spindle 3 comes to a stop, the delayed signal permits pressurized fluid to enter upper cylinder chamber 79 through pipe 81. Fluid pressure forces piston rod 73 with roller 70 downwards so that roller 70 engages the periphery of slowly turning disc 68. When notch 67 is engaged by roller 70, the roller is displaced downwards the same amount. When roller 70 engages notch 67 disc 68 is prevented from turning, contact arm 83 contacts lower switch 86 which makes electrical contact to send a signal indicating that main spindle 3 has stopped at the desired oriented position. Another signal initiates entry of pressurized fluid into the lower cylinder chamber 80 and also initiates exhausting of the pressurized fluid contained in upper chamber 79 through a hydraulic system control device.

When pressurized fluid enters lower cylinder chamber 80 piston rod 73 rises and contact arm 83 engages upper limit switch 85, and causes it to make contact. The signal derived from this contact cuts off the pressurized fluid entering lower cylinder chamber 80. A hydraulic control device activates a valve to prevent leakage of the pressurized fluid from the lower cylinder chamber and thus piston rod 73 is maintained in the rest position.

If roller 70 of the second positioning device 71 does not engage with notch 67 of disc 68, i.e., if main spindle 3 comes to a halt prior to roller 70 engaging notch 67, the second positioning device returns to its normal position and slow speed transmission 42 is activated and main spindle 3 is slowly rotated and the aforedescribed operation duplicated till the spindle is brought to a stop in the oriented position.

What we claim:

1. A stop mechanism for stopping the spindle of a machine tool in a selected position comprising means for driving said spindle in a working cycle, means responsive to a control signal for deenergizing said driving means, means responsive to a control signal after said spindle has stopped rotating for driving the spindle at a speed lower than the speed of rotation in said working cycle, sensing means responsive to a control signal for sensing a preselected position of said spindle to deenergize said lower speed driving means when said spindle is in said preselected position, means responsive to the said preselected position of the spindle for energizing a locking means, and means responsive to the selected position of the spindle for locking the spindle by said locking means in said selected position.

2. A stop mechanism as defined in claim 1 further including means responsive to a control signal for unlocking the spindle.

3. A stop mechanism as defined in claim 1 further including means for momentary reenergizing and deenergizing said lower speed driving means to rotate the spindle to said selected position upon failure of the locking means to lock the spindle in the said selected position.

4. A stop mechanism as defined in claim 1 wherein said sensing means comprises a cam secured to the spindle and a follower for engagement with the cam, said cam being formed with a depressed portion for engagement by the follower.

5. A stop mechanism as defined in claim 2 wherein the locking means comprises a disc secured to the spindle, a notch in the periphery of the disc, and a follower for engagement with the notch.

6. A stop mechanism as defined in claim 5 wherein the means for unlocking the spindle comprises a pair of contacts carried by the follower, a pair of spaced fixed contacts for engagement by said pair of contacts, and means responsive to the closing of one pair of contacts for withdrawing the follower from the notch and means responsive to the withdrawn position of the follower for closing the other pair of contacts to retain the follower in the withdrawn position.

* * * * *